United States Patent
Loh et al.

(10) Patent No.: US 11,341,420 B2
(45) Date of Patent: May 24, 2022

(54) HYPERPARAMETER OPTIMIZATION METHOD AND APPARATUS

(71) Applicant: SAMSUNG SDS Co., Ltd., Seoul (KR)

(72) Inventors: Hyun Bin Loh, Seoul (KR); Seung Jai Min, Seoul (KR); Ki Hyo Moon, Seoul (KR); Sung Jun Kim, Seoul (KR); Ji Su Jeong, Seoul (KR); Jin Hwan Han, Seoul (KR)

(73) Assignee: SAMSUNG SDS Co., Ltd., Seoul (KR)

( * ) Notice: Subject to any disclaimer, the term of this patent is extended or adjusted under 35 U.S.C. 154(b) by 385 days.

(21) Appl. No.: 16/545,328

(22) Filed: Aug. 20, 2019

(65) Prior Publication Data

US 2020/0057944 A1    Feb. 20, 2020

(30) Foreign Application Priority Data

Aug. 20, 2018    (KR) .................. 10-2018-0096891

(51) Int. Cl.
*G06F 17/00*        (2019.01)
*G06N 5/02*         (2006.01)
*G06N 20/00*        (2019.01)
*G06F 16/35*        (2019.01)

(52) U.S. Cl.
CPC ............... *G06N 5/02* (2013.01); *G06N 20/00* (2019.01); *G06F 16/35* (2019.01)

(58) Field of Classification Search
CPC .......... G06F 16/35; G06N 20/00; G06N 5/02; G06N 5/003
See application file for complete search history.

(56) References Cited

U.S. PATENT DOCUMENTS

| | | | | |
|---|---|---|---|---|
| 10,592,554 | B1* | 3/2020 | Merritt | G06F 16/9027 |
| 11,087,880 | B1* | 8/2021 | Shah | G16H 50/20 |
| 2016/0110657 | A1* | 4/2016 | Gibiansky | G06N 20/00 706/12 |
| 2016/0132787 | A1* | 5/2016 | Drevo | G06N 20/10 706/12 |
| 2019/0043487 | A1* | 2/2019 | Rivkin | G10L 15/32 |
| 2019/0095818 | A1* | 3/2019 | Varadarajan | G06N 20/00 |
| 2019/0244139 | A1* | 8/2019 | Varadarajan | G06N 20/00 |

FOREIGN PATENT DOCUMENTS

KR    10-2017-0034258 A    3/2017

OTHER PUBLICATIONS

Lisha Li, Kevin Jamieson, Giulia DeSalvo, Afshin Rostamizadeh, and Ameet Talwalkar. Hyperband: a novel bandit-based approach to hyperparameter optimization. J. Mach. Learn. Res. 18, Issue 1, 6765-6816, January (Year: 2017).*
Tianbing Xu, Zhongfei Zhang, Philip S. Yu, and Bo Long, Generative Models for Evolutionary Clustering. ACM Trans. Knowl. Discov . from Data, vol. 6, Issue 2, Article 7, 27 pages, July (Year: 2012).*

* cited by examiner

*Primary Examiner* — Greta L Robinson
(74) *Attorney, Agent, or Firm* — The PL Law Group, PLLC

(57) ABSTRACT

A hyperparameter optimization method performed by a hyperparameter optimization apparatus to optimize hyperparameters of a model includes calculating an evaluation score for each of a plurality of hyperparameter samples constituting a first hyperparameter sample set by applying each of the hyperparameter samples to a target model, performing weighted clustering of the hyperparameter samples by using the calculated evaluation scores as weights and constructing a second hyperparameter sample set based on the clustering result.

16 Claims, 15 Drawing Sheets

HYPERPARAMETER OPTIMIZATION METHOD AND APPARATUS

CROSS-REFERENCE TO RELATED APPLICATION AND CLAIM OF PRIORITY

This application claims priority to Korean Patent Application No. 10-2018-0096891, filed on Aug. 20, 2018, in the Korean Intellectual Property Office (KIPO), the entire disclosure of which is incorporated by reference herein.

BACKGROUND

1. Field

The present disclosure relates to a hyperparameter optimization method and apparatus, and more particularly, to a method of automatically optimizing hyperparameters of a model in order to improve the performance of the model and an apparatus for performing the method.

2. Description of the Related Art

A hyperparameter of a model is a parameter that must be set before training is performed. Hyperparameters differ from model parameters in that they must be set before training, whereas the model parameters are learned through training.

Hyperparameter optimization or hyperparameter tuning refers to adjusting values of hyperparameters in order to maximize the performance of a model. Since the performance of a model greatly varies depending on set values of hyperparameters, hyperparameter optimization is one of the very important tasks in the field of dealing with data-based models, such as machine learning.

Specifically, for example, one of the typical hyperparameters of a machine learning model is a learning rate. The learning rate is a hyperparameter that controls the degree of movement toward a gradient in a gradient descent algorithm. Here, the gradient descent algorithm is a technique mainly used to find a minimum of a loss function when training a target model. A loss function of a complex model has a high-dimensional shape as illustrated in FIG. 1. Therefore, depending on a set value of the learning rate, a local minimum may be found as the minimum, or a global minimum may be found as the minimum. In addition, if the local minimum is found as the minimum, the performance of the target model is degraded because parameters of the target model are not properly trained. Since the performance of a model greatly varies depending on the set value of the learning rate as described above, it is very important to find an appropriate setting value through hyperparameter optimization.

Hyperparameter optimization is generally manually performed by a skilled expert in the art. However, optimization performed by an expert relies heavily on the experience of the expert, and the performance of a model depends greatly on the proficiency of the expert. Most of all, it is very difficult to find a skilled expert.

Recently, a grid search technique has been suggested as another method of hyperparameter optimization. The grid search technique is a method of determining an optimal combination of hyperparameters by trying all possible combinations of hyperparameters. The grid search technique can produce an optimal combination of hyperparameters but consumes excessively large computing and time costs. In addition, it is virtually impossible to perform a grid search on the entire hyperparameter space.

To make up for the inefficiency of the grid search technique, a random search technique has been suggested. However, since the random search is a technique of finding an optimal combination of hyperparameters by randomly sampling combinations of hyperparameters, it is virtually difficult to produce an optimal combination of hyperparameters, and the result of optimization may vary every time.

SUMMARY

Aspects of the present disclosure provide a method of optimizing hyperparameters of a model more efficiently in terms of computing cost and time cost and an apparatus for performing the method.

Aspects of the present disclosure also provide a method of efficiently updating hyperparameters of a model when a dataset is updated and an apparatus for performing the method.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

According to an aspect of the present disclosure, there is provided A hyperparameter optimization method performed by a hyperparameter optimization apparatus to optimize hyperparameters of a model, the method comprising calculating an evaluation score for each of a plurality of hyperparameter samples constituting a first hyperparameter sample set by applying each of the hyperparameter samples to a target model, performing weighted clustering of the hyperparameter samples by using the calculated evaluation scores as weights, and constructing a second hyperparameter sample set based on the clustering result.

According to another aspect of the present disclosure, there is provided A hyperparameter optimization apparatus comprising a processor and a memory which stores one or more programs to be executed by the processor, wherein the programs comprise instructions for performing, an operation of calculating an evaluation score for each of a plurality of hyperparameter samples constituting a first hyperparameter sample set by applying each of the hyperparameter samples to a target model, an operation of performing weighted clustering of the hyperparameter samples by using the calculated evaluation scores as weights and an operation of constructing a second hyperparameter sample set based on the clustering result.

Other features and exemplary embodiments may be apparent from the following detailed description, the drawings, and the claims.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
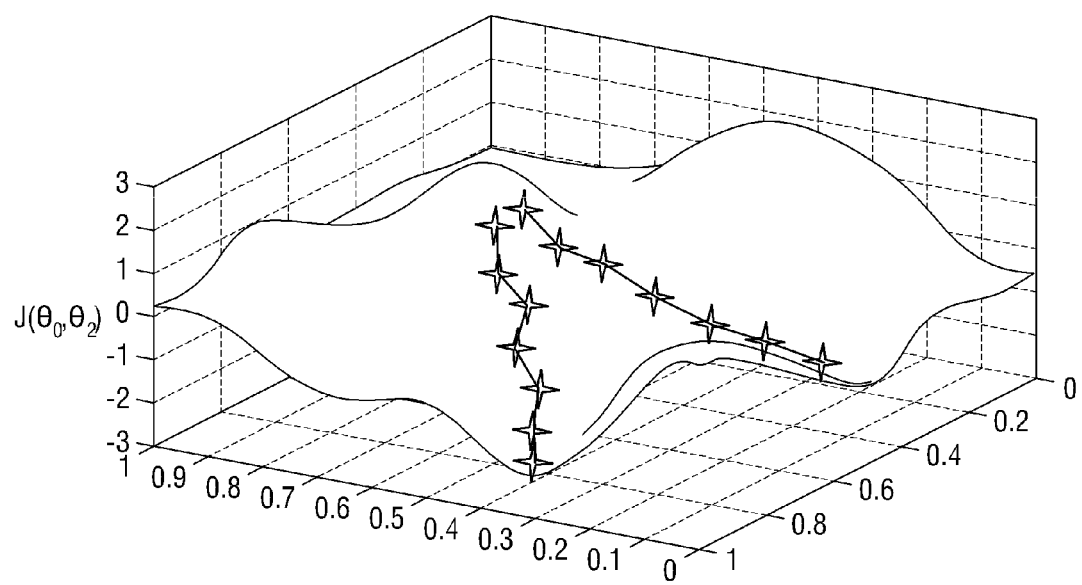
FIG. 1 is a diagram for explaining the effect of a hyperparameter on the performance of a machine learning model.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Like numbers refer to like elements throughout.

Unless otherwise defined, all terms including technical and scientific terms used herein have the same meaning as commonly understood by one of ordinary skill in the art to which this disclosure belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms are intended to include the plural forms as well, unless the context clearly indicates otherwise.

It will be understood that the terms "comprise" and/or "comprising" when used herein, specify some stated components, steps, operations and/or elements, but do not preclude the presence or addition of one or more other components, steps, operations and/or elements.

Prior to the description of the present specification, some terms used herein will be clarified.

A model, as used herein, is an abstract concept encompassing all data-based models having hyperparameters. Here, a data-based model may be a model that abstracts data relationships, distribution, etc. A typical example of the model is a machine learning model, but the technical scope of the present disclosure is not limited to this example.

A hyperparameter of a model, as used herein, is a parameter that is set before training of the model is performed. For example, in the field of machine learning, hyperparameters may include a learning rate, a weight decay, a batch size, etc. Hyperparameters differ from model parameters (e.g., a weight of a neural network) in that they are set before training, whereas the model parameters are learned through training.

An instruction, as used herein, is a series of commands bundled together based on function, is a component of a computer program, and is executed by a processor.

Hereinafter, embodiments of the present disclosure will be described in detail with reference to the attached drawings.

Figure 2:
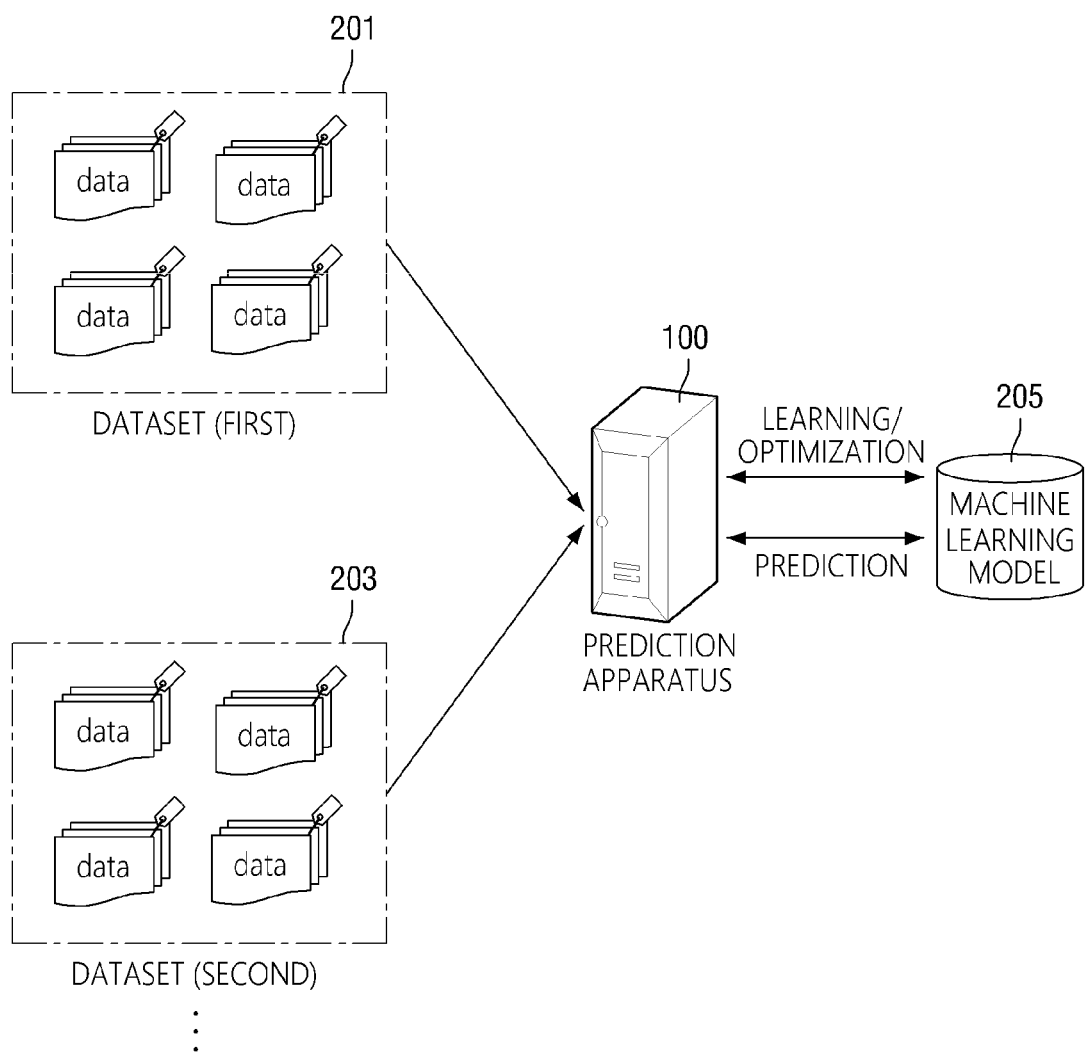
FIG. 2 illustrates an exemplary computing system to which the technical idea of the present disclosure can be applied.

FIG. 2 illustrates an exemplary computing system to which the technical idea of the present disclosure can be applied.

Referring to FIG. 2, the computing system may be configured to include a prediction apparatus 100. However, this is merely an embodiment for achieving the objectives of the present disclosure, and some components can be added or deleted as needed.

In the computing system, the prediction apparatus 100 is a computing device that performs a prediction function using a predetermined machine learning model 205. The computing device may be a notebook computer, a desktop computer, a laptop computer, or the like. However, the computing device is not limited to these examples and can be any type of device having a computing function.

Specifically, the prediction apparatus 100 may train the machine learning model 205 using given datasets 201 and 203 and perform a predetermined prediction function using the trained machine learning model 205. For example, if the datasets 201 and 203 are observation data on whether a process is abnormal or normal, the prediction apparatus 100 may train the machine learning model 205 based on the observation data and predict the state (e.g., abnormal or normal) of the process using the trained machine learning model 205.

According to embodiments, the prediction apparatus 100 may optimize hyperparameters of the machine learning model 205 in order to maximize the performance (e.g., accuracy) of the machine learning model 205. Specifically, the prediction apparatus 100 may derive an optimal hyperparameter sample set of the machine learning model 205 for the dataset 201 and update the optimal hyperparameter sample set according to the additional dataset 203 when the additional dataset 203 is provided. In such embodiments only, the prediction apparatus 100 may also be referred to as a hyperparameter optimization apparatus 100. A method by which the prediction apparatus 100 performs hyperparameter optimization will be described in detail later with reference to FIG. 3 and subsequent drawings. According to the current embodiments, since the performance of the machine learning model 205 is improved through hyperparameter optimization, the accuracy of the prediction result can be improved.

Until now, the exemplary computing system to which the technical idea of the present disclosure can be applied has been described with reference to FIG. 2. The configuration and operation of a hyperparameter optimization apparatus 100 according to an embodiment will now be described with reference to FIGS. 3 and 4. For ease of description, the hyperparameter optimization apparatus 100 will hereinafter be abbreviated as the optimization apparatus 100.

Figure 3:
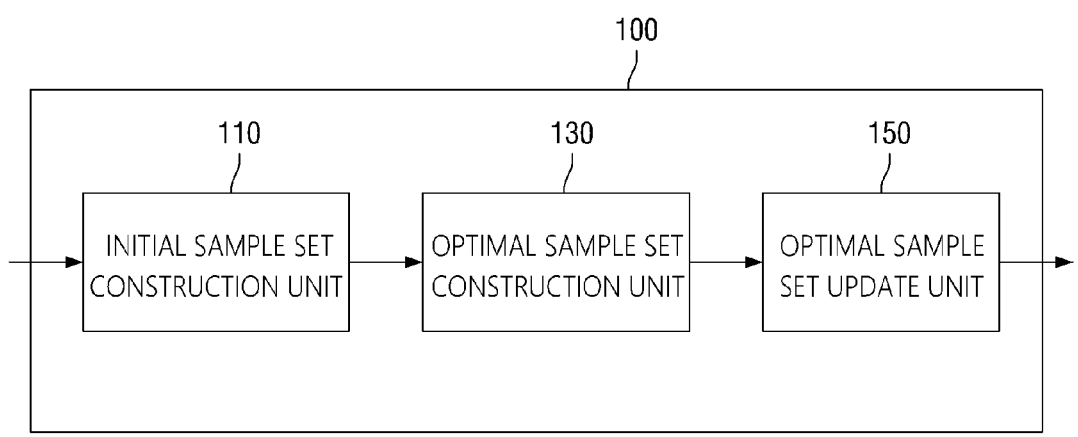
FIG. 3 is a block diagram of an optimization apparatus according to an embodiment.

FIG. 3 is a block diagram of an optimization apparatus 100 according to an embodiment.

Referring to FIG. 3, the optimization apparatus 100 may include an initial sample set construction unit 110, an optimal sample set construction unit 130, and an optimal sample set update unit 150. In FIG. 3, only the components related to the embodiment are illustrated. Therefore, it will be understood by those of ordinary skill in the art to which the present disclosure pertains that other general-purpose components can be included in addition to the components illustrated in FIG. 3. Each component will now be described.

The initial sample set construction unit 110 constructs an initial hyperparameter sample set that includes at least one hyperparameter sample. For example, the initial sample set construction unit 110 may sample hyperparameter samples by performing a grid search or a random search in a specific search area and construct an initial hyperparameter sample set based on the sampled hyperparameter samples.

A specific method of constructing the initial hyperparameter sample set may vary depending on embodiments. The specific method will be described later with reference to FIGS. 5 through 10.

Next, the optimal sample set construction unit 130 constructs an optimal hyperparameter sample set based on the initial hyperparameter sample set. A specific method by which the optimal sample set construction unit 130 constructs the optimal hyperparameter sample set may vary depending on embodiments. To avoid redundant description, the specific method will be described later with reference to FIGS. 5, 11 through 14, 16 and 17.

Next, the optimal sample set update unit 150 updates the optimal hyperparameter sample set in response to the update of a dataset. This is because, if the dataset is changed, the accuracy of a target model can be reduced, and values of hyperparameters that maximize the performance of the target model can also be changed. A specific method by which the optimal sample set update unit 130 updates the optimal hyperparameter sample set may vary depending on embodiments. To avoid redundant description, the specific method will be described later with reference to FIGS. 5, 15, 16 and 18.

Each component of the optimization apparatus 100 illustrated in FIG. 3 may means, but is not limited to, a software or hardware component such as a Field Programmable Gate Array (FPGA) or Application Specific Integrated Circuit (ASIC). A component may advantageously be configured to reside on the addressable storage medium and configured to execute on one or more processors. The functionality provided for in the components may be combined into fewer components or further separated into additional components.

Figure 4:
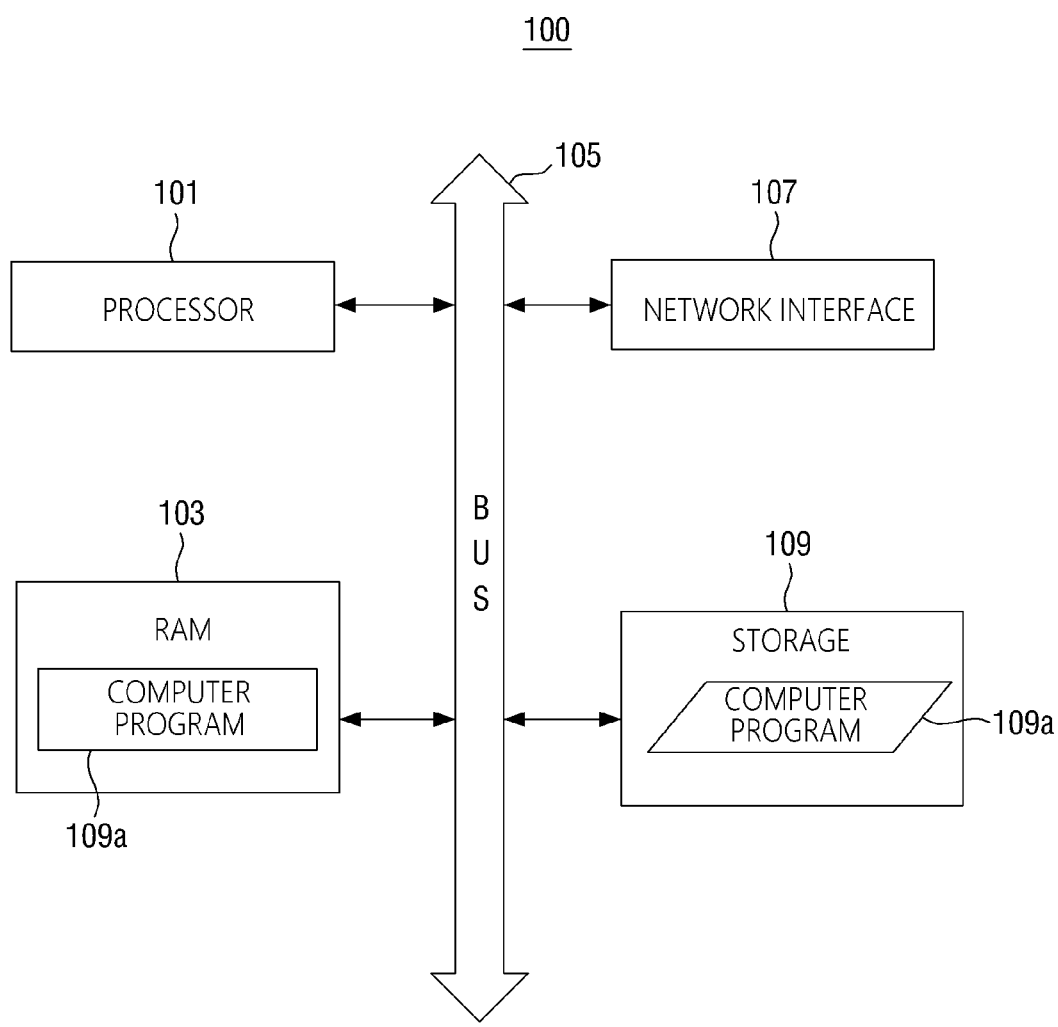
FIG. 4 illustrates the hardware configuration of the optimization apparatus according to the embodiment.

FIG. 4 illustrates the hardware configuration of the optimization apparatus 100 according to the embodiment.

Referring to FIG. 4, the optimization apparatus 100 may include one or more processors 101, a bus 105, a network interface 107, a memory 103 which loads a computer program to be executed by the processors 101, and a storage 109 which stores hyperparameter optimization software 109*a*. In FIG. 4, only the components related to the embodiment are illustrated. Therefore, it will be understood by those of ordinary skill in the art to which the present disclosure pertains that other general-purpose components can be included in addition to the components illustrated in FIG. 4.

The processors 101 control the overall operation of each component of the hyperparameter optimization apparatus 100. The processors 101 may include a central processing unit (CPU), a micro-processor unit (MPU), a micro-controller unit (MCU), a graphic processing unit (GPU), or any form of processor well known in the art to which the present disclosure pertains. In addition, the processors 101 may perform an operation on at least one application or program for executing methods according to embodiments. The hyperparameter optimization apparatus 100 may include one or more processors.

The memory 103 stores various data, commands and/or information. The memory 103 may load one or more programs 109*a* from the storage 109 in order to execute hyperparameter optimization methods according to embodiments. In FIG. 4, a random access memory (RAM) is illustrated as an example of the memory 103.

When one or more programs 109*a* are loaded into the memory 103, modules such as those illustrated in FIG. 3 may be implemented in the form of logic in the memory 103.

The bus 105 provides a communication function between the components of the optimization apparatus 100. The bus 105 may be implemented as various forms of buses such as an address bus, a data bus and a control bus.

The network interface 107 supports wired and wireless Internet communication of the hyperparameter optimization apparatus 100. In addition, the network interface 107 may support various communication methods other than Internet communication. To this end, the network interface 107 may include a communication module well known in the art to which the present disclosure pertains.

Depending on embodiments, the network interface 107 can be omitted.

The storage 109 may non-temporarily store the programs 109*a*. In FIG. 4, the hyperparameter optimization software 109*a* is illustrated as an example of the programs 109*a*.

The storage 109 may include a non-volatile memory, such as a read only memory (ROM), an erasable programmable ROM (EPROM), an electrically erasable programmable ROM (EEPROM) or a flash memory, a hard disk, a removable disk, or any form of computer-readable recording medium well known in the art to which the present disclosure pertains.

The computer program 109*a* may include instructions for controlling the processors 101 to perform hyperparameter optimization methods according to embodiments when the computer program 109*a* is loaded into the memory 103.

For example, the computer program 109*a* may include instructions for performing an operation of calculating an evaluation score for each of a plurality of hyperparameter samples constituting an initial hyperparameter sample set by applying each of the hyperparameter samples to a target model, an operation of performing weighted clustering of the hyperparameter samples by using the calculated evaluation scores as weights, and an operation of constructing an optimal hyperparameter sample set based on the clustering result.

For another example, the computer program 109*a* may include instructions for performing an operation of calculating an evaluation score for each of a plurality of hyperparameter samples constituting an initial hyperparameter sample set by applying each of the hyperparameter samples to a target model, an operation of sampling first hyperparameter samples based on the calculated evaluation scores, an operation of sampling second hyperparameter samples regardless of the calculated evaluation scores, and an operation of constructing an optimal hyperparameter sample set based on at least some of the first and second hyperparameter samples.

In addition, the computer program 109a may include instructions for performing methods according to embodiments.

Until now, the configuration and operation of the optimization apparatus 100 according to the embodiment have been described with reference to FIGS. 3 and 4. Hereinafter, hyperparameter optimization methods according to embodiments will be described in detail with reference to FIG. 5 and subsequent drawings.

Each operation of a hyperparameter optimization method according to an embodiment to be described below may be performed by a computing device. For example, the computing device may be the optimization apparatus 100. However, the subject of each operation included in the hyperparameter optimization method may be omitted for ease of description. In addition, each operation of the hyperparameter optimization method may be implemented as an instruction of a computer program executed by a processor.

Figure 5:
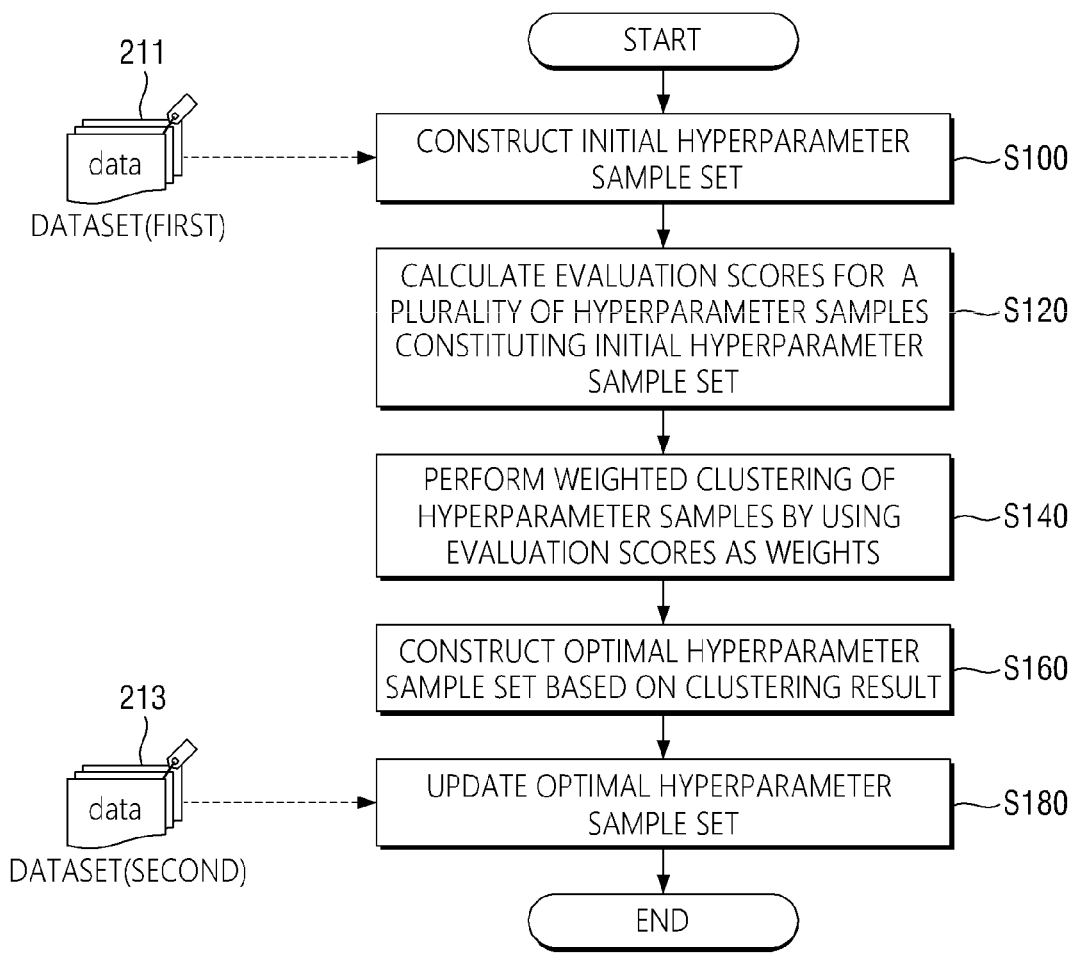
FIG. 5 is a flowchart illustrating a hyperparameter optimization method according to a first embodiment.
Figure 6:
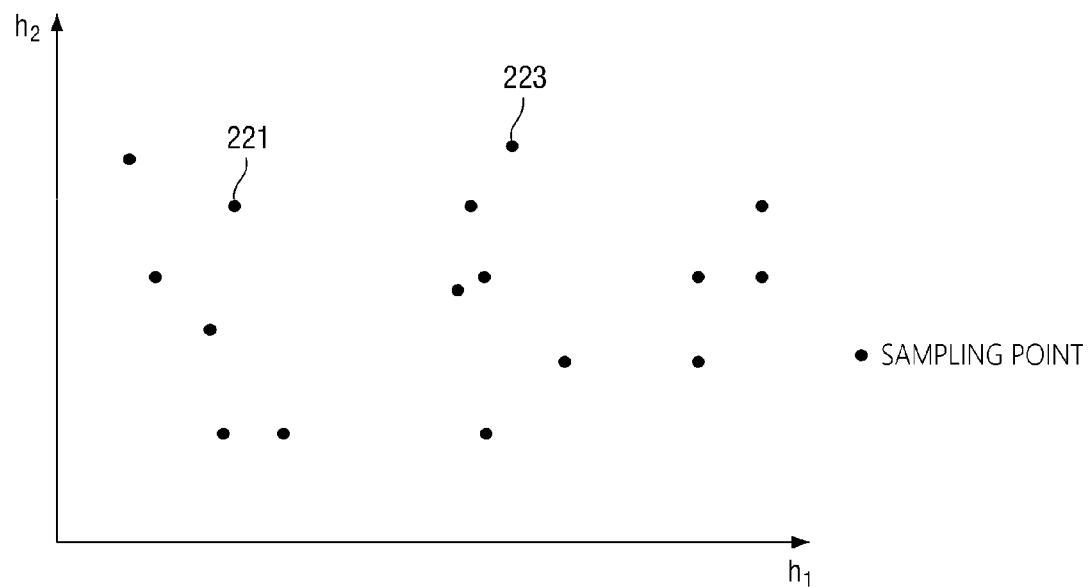
FIG. 6 is a diagram for explaining a random search technique which can be referred to in some embodiments.
Figure 7:
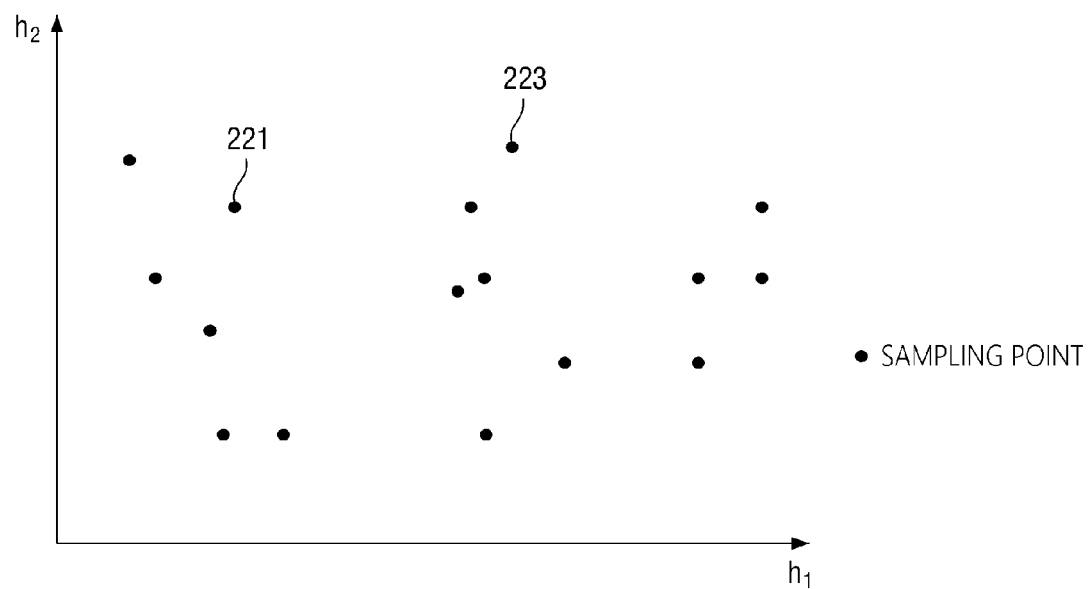
FIG. 7 is a diagram for explaining a grid search technique which can be referred to in some embodiments.
Figure 8:
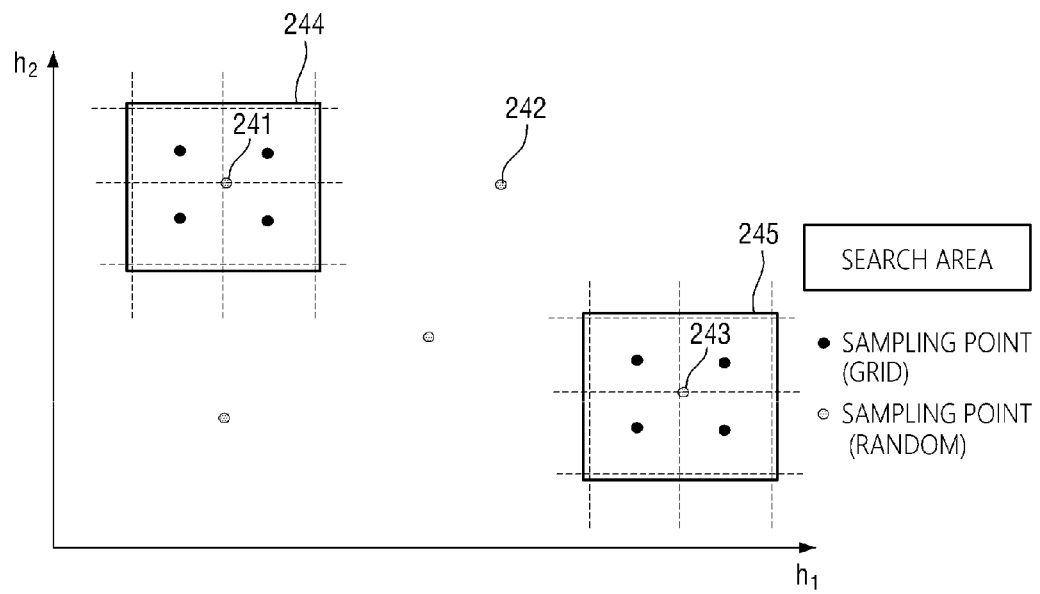
FIG. 8 is a diagram for explaining a method of utilizing both the random search technique and the grid search technique, which can be referred to in some embodiments.

FIG. 5 is a flowchart illustrating a hyperparameter optimization method according to a first embodiment. However, this is merely an embodiment for achieving the objectives of the present disclosure, and some operations can be added or deleted as needed.

Referring to FIG. 5, the hyperparameter optimization method according to the first embodiment starts with operation S100 in which the optimization apparatus 100 constructs an initial hyperparameter sample set. A specific method of constructing the initial hyperparameter sample set may vary depending on embodiments.

In some embodiments, the initial hyperparameter sample set may be constructed based on hyperparameter samples sampled using a random search technique. For example, referring to FIG. 6, the optimization apparatus 100 may sample hyperparameter samples in a hyperparameter space based on randomly determined sampling points 221, 223, etc. and construct the initial hyperparameter sample set based on the sampled hyperparameter samples. According to an embodiment, the optimization apparatus 100 may apply each of the sampled hyperparameter samples and a given dataset 211 to a target model, calculate an evaluation score for each of the hyperparameter samples through performance evaluation, and construct the initial hyperparameter sample set using samples whose calculated evaluation scores are equal to or greater than a threshold. Here, performing the performance evaluation by applying the hyperparameter samples to the target model can be understood as setting parameter values of the target model to the hyperparameter samples, training the target model using the given dataset, and then performing the performance evaluation.

In some embodiments, the initial hyperparameter sample set may be constructed based on hyperparameter samples sampled using a grid search technique. For example, referring to FIG. 7, the optimization apparatus 100 may form a grid in a certain search area 231 of a hyperparameter space. In addition, the optimization apparatus 100 may sample hyperparameter samples by searching the formed grid. The optimization apparatus 100 may construct the initial hyperparameter sample set based on the sampled hyperparameter samples. According to an embodiment, the optimization apparatus 100 may apply each of the sampled hyperparameter samples and the given dataset 211 to the target model. In addition, the optimization apparatus 100 may calculate an evaluation score for each of the hyperparameter samples through performance evaluation and construct the initial hyperparameter sample set using samples whose calculated evaluation scores are equal to or greater than a threshold.

In some embodiments, the initial hyperparameter sample set may be constructed based on hyperparameter samples sampled using both a random search and a grid search. For example, the optimization apparatus 100 may sample some hyperparameter samples through a random search. In addition, the optimization apparatus 100 may sample other hyperparameter samples through a grid search. The optimization apparatus 100 may construct the initial hyperparameter sample set based on the sampled hyperparameter samples. For another example, referring to FIG. 8, the optimization apparatus 100 may designate search areas 244 and 245 through a random search, sample hyperparameter samples through a grid search in the designated search areas 244 and 245, and construct the initial hyperparameter sample set based on the sampled hyperparameter samples. Here, the optimization apparatus 100 may designate the grid search areas 244 and 245 based on sampling points 241 and 243 of some hyperparameter samples whose evaluation scores are high among sampling points 241, 242, 243, etc. determined through a random search. According to the current embodiments, it is possible to construct a superior initial hyperparameter sample set for computing costs by utilizing the advantages of both the grid search technique and the random search technique.

Figure 9:
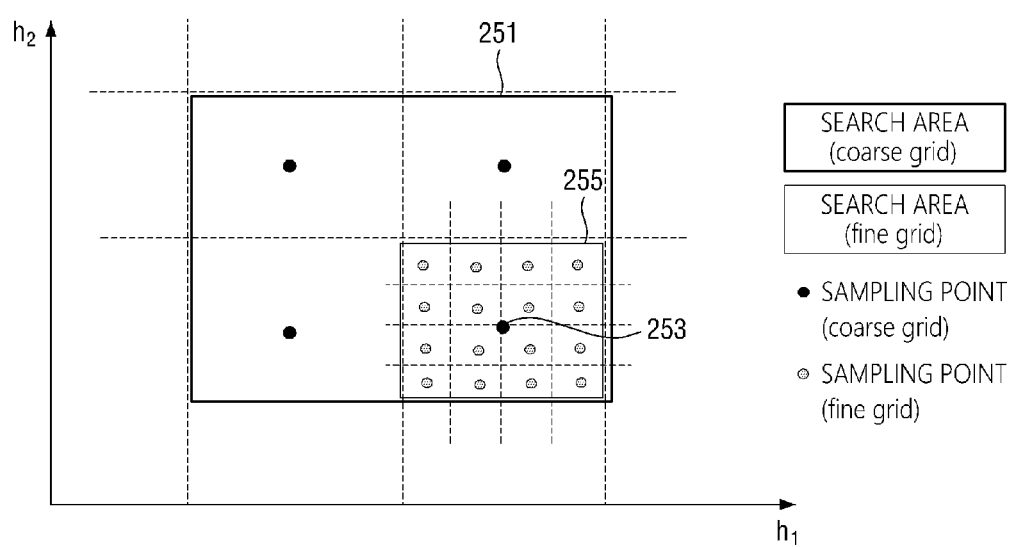
FIG. 9 is a diagram for explaining a grid search method which can be referred to in some embodiments.

In some embodiments, a grid search may be performed as illustrated in FIG. 9. Specifically, the optimization apparatus 100 may form a coarse first grid in a designated search area 251 and search the first grid to determine an area 255 where a hyperparameter sample whose evaluation score is equal to or greater than a threshold has been sampled. Then, the optimization apparatus 100 may form a fine second grid in the determined area 255 and sample a hyperparameter sample by searching the second grid. According to the current embodiments, through the adjustment of grid spacing, an intensive search can be performed in a sampling area where a hyperparameter sample having high performance is predicted to be located. Therefore, it is possible to sample a hyperparameter sample having superior performance for computing costs consumed.

Figure 10:
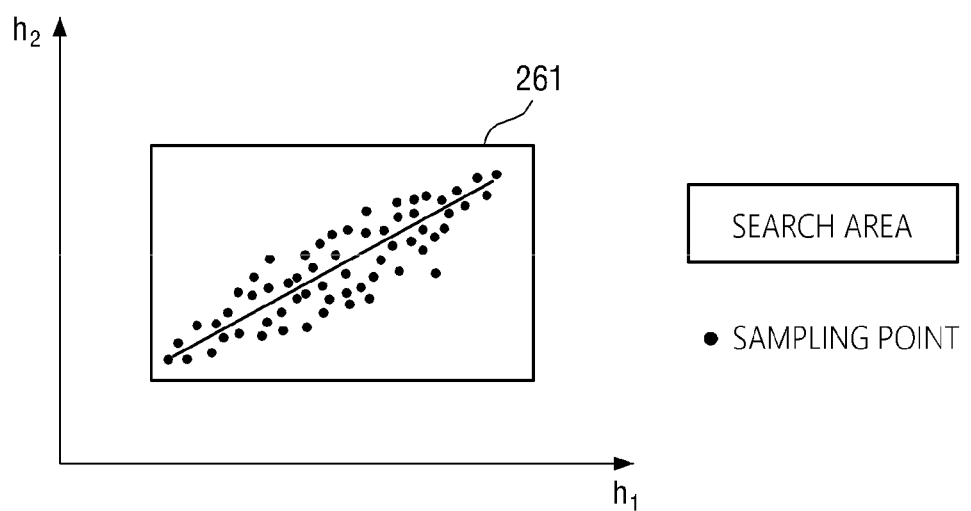
FIG. 10 is a diagram for explaining a correlation-based hyperparameter value sampling method which can be referred to in some embodiments.

In the above-described embodiments, the optimization apparatus 100 may sample some values of a hyperparameter sample using a correlation between hyperparameters. For example, it is assumed that one hyperparameter sample is composed of values of a plurality of hyperparameters and that, as illustrated in FIG. 10, a correlation exists between a first hyperparameter $h_1$ and a second hyperparameter $h_2$ among the hyperparameters. In this case, the optimization apparatus 100 may sample a value of the first hyperparameter $h_1$ in a designated search area 261 according to the above-described embodiments and sample a value of the second hyperparameter $h_2$ based on the correlation. In addition, the optimization apparatus 100 may sample values of the other hyperparameters, for which no correlation exists, and generate a hyperparameter sample by aggregating the sampled values. According to the current embodiments, the accuracy of sampling can be significantly improved by utilizing prior knowledge about the correlation.

In some embodiments, the initial hyperparameter sample may be constructed based on a combination of the above-described embodiments.

In the above-described embodiments, the number of hyperparameter samples sampled, the number of samples constituting the initial hyperparameter sample set, the number of search areas, the size of a search area, etc. may be regarded as parameters associated with the optimization apparatus 100, and the parameters may be set to preset fixed values or variable values that vary according to situation. For example, the optimization apparatus 100 may dynamically set the values of the above listed parameters based on computing performance, accuracy requirements of the target model, etc.

Referring again to FIG. 5, in operation S120, the optimization apparatus 100 calculates evaluation scores for a plurality of hyperparameter samples constituting the initial hyperparameter sample set. Specifically, the optimization apparatus 100 may apply a first hyperparameter sample among the hyperparameter samples to the target model and train the target model using the given dataset 211. Then, the optimization apparatus 100 may calculate an evaluation score for the first hyperparameter sample by evaluating (e.g., cross-validating) the performance of the target model. The optimization apparatus 100 may calculate an evaluation score for each of the hyperparameter samples constituting the initial hyperparameter sample set by repeating the above process on the other hyperparameter samples. If the evaluation scores were already calculated in the previous operation S100, operation S120 can be omitted.

In operation S140, the optimization apparatus 100 performs weighted clustering of the hyperparameter samples using the calculated evaluation scores as weights. The weighted clustering is a concept already widely known in the art to which the present disclosure pertains, and thus a description thereof is omitted.

Figure 11:
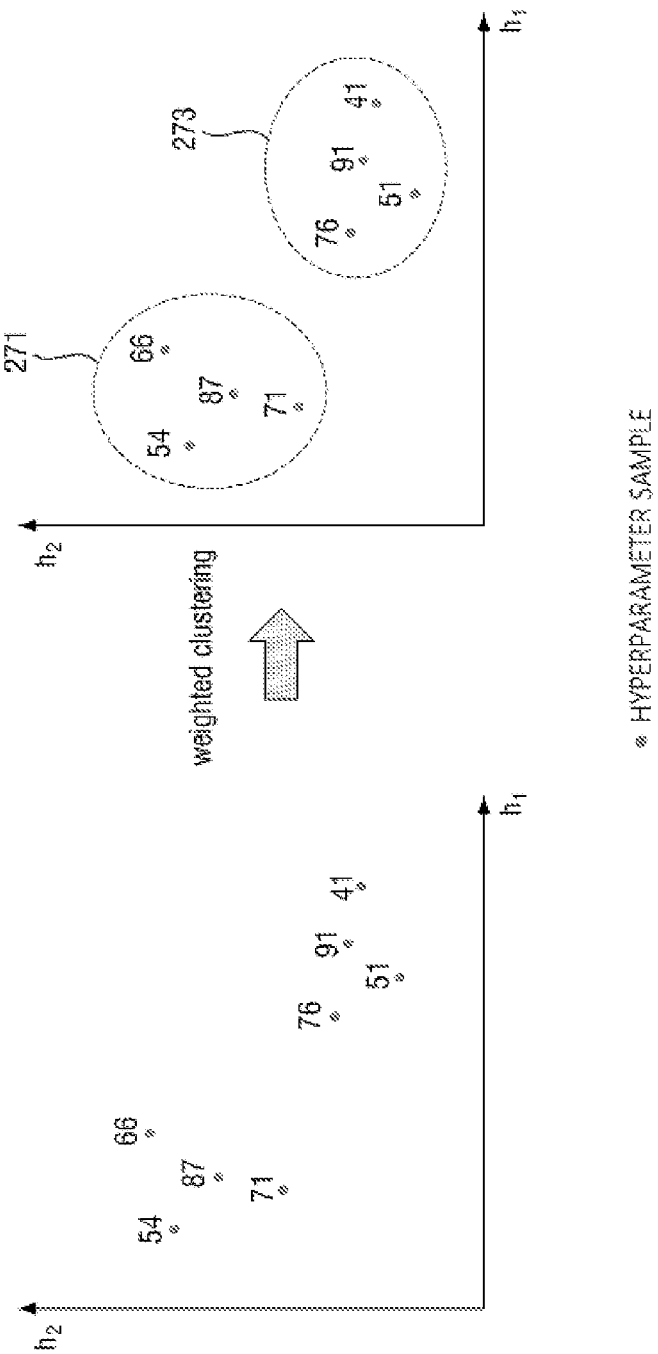
FIG. 11 is a diagram for explaining a weighted clustering technique which can be referred to in some embodiments.

An example of the process of performing the weighted clustering is illustrated in FIG. 11. In FIG. 11, points shown in a hyperparameter space correspond to hyperparameter samples, and numbers displayed adjacent to the points indicate evaluation scores of the hyperparameter samples.

Referring to FIG. 11, if the weighted clustering is performed, the hyperparameter samples may be clustered such that hyperparameter samples having high evaluation scores are located adjacent to centroids of clusters 271 and 273.

In operation S160, the optimization apparatus 100 constructs an optimal hyperparameter sample set based on the clustering result. A specific method of constructing the optimal hyperparameter sample set may vary depending on embodiments.

Figure 12:
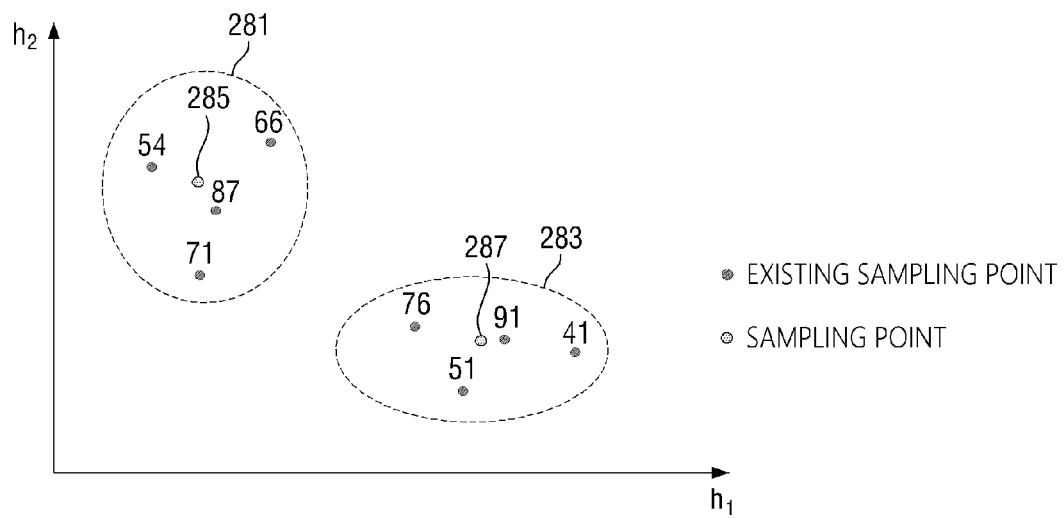
FIGS. 12 through 14 are diagrams for explaining a method of sampling hyperparameter samples based on the clustering result, which can be referred to in some embodiments.

In some embodiments, referring to FIG. 12, the optimization apparatus 100 may sample a hyperparameter sample at a centroid 285 or 287 of each cluster 281 or 283 and add the sampled hyperparameter sample to the optimal hyperparameter sample set. As described above, if the weighted clustering is performed, a hyperparameter sample having a high evaluation score is positioned adjacent to the centroid of a corresponding cluster. Therefore, the optimization apparatus 100 samples the hyperparameter sample at the centroid 285 or 287 of each cluster 281 or 283 and adds the sampled hyperparameter sample to the optimal hyperparameter sample set because evaluation scores of the hyperparameter samples indicated by the centroids 285 and 287 are likely to be high. According to an embodiment, the optimization apparatus 100 may calculate predicted evaluation scores for the hyperparameter samples corresponding to the centroids 285 and 287 and add only a sample whose predicted evaluation score satisfies a predetermined condition (e.g., is equal to or greater than a threshold, is included in top n scores, etc.) to the optimal hyperparameter sample set. The predicted evaluation score may be calculated based on the average of all hyperparameter samples included in a corresponding cluster or at least some (e.g., samples located within a predetermined distance from the centroid) of the hyperparameter samples. The optimization apparatus 100 may also calculate actual evaluation scores of the hyperparameter samples corresponding to the centroids 285 and 287 through performance evaluation.

Figure 13:
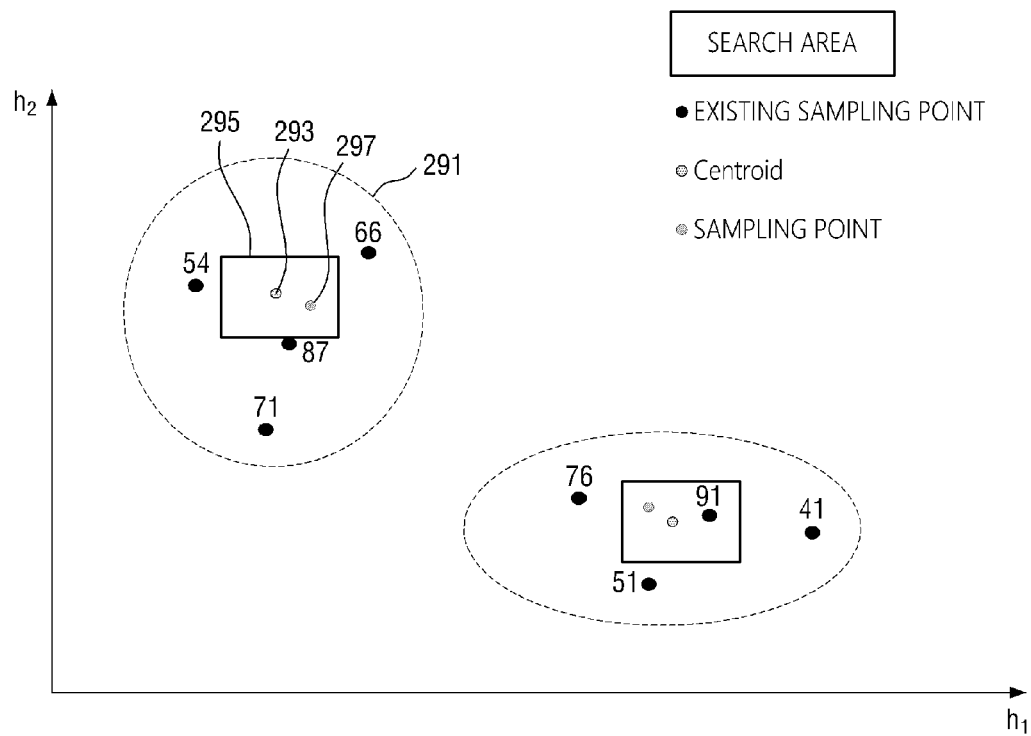

In some embodiments, referring to FIG. 13, the optimization apparatus 100 may designate a search area 295 of a predetermined size based on a centroid 293 of a cluster 291 and sample a hyperparameter sample 297 by searching the search area 295 according to the above-described embodiments. In addition, the optimization apparatus 100 may add the hyperparameter sample 297 to the optimal hyperparameter sample set. According to an embodiment, the optimization apparatus 100 may add the hyperparameter sample 297 to the optimal hyperparameter sample set in response to the determination that a predicted evaluation score or an actual evaluation score of the hyperparameter sample 297 satisfies a predetermined condition. According to the current embodiments, since a hyperparameter sample predicted to have superior performance because it is located adjacent to the centroid of a cluster is sampled, the accuracy of sampling can be improved.

Figure 14:
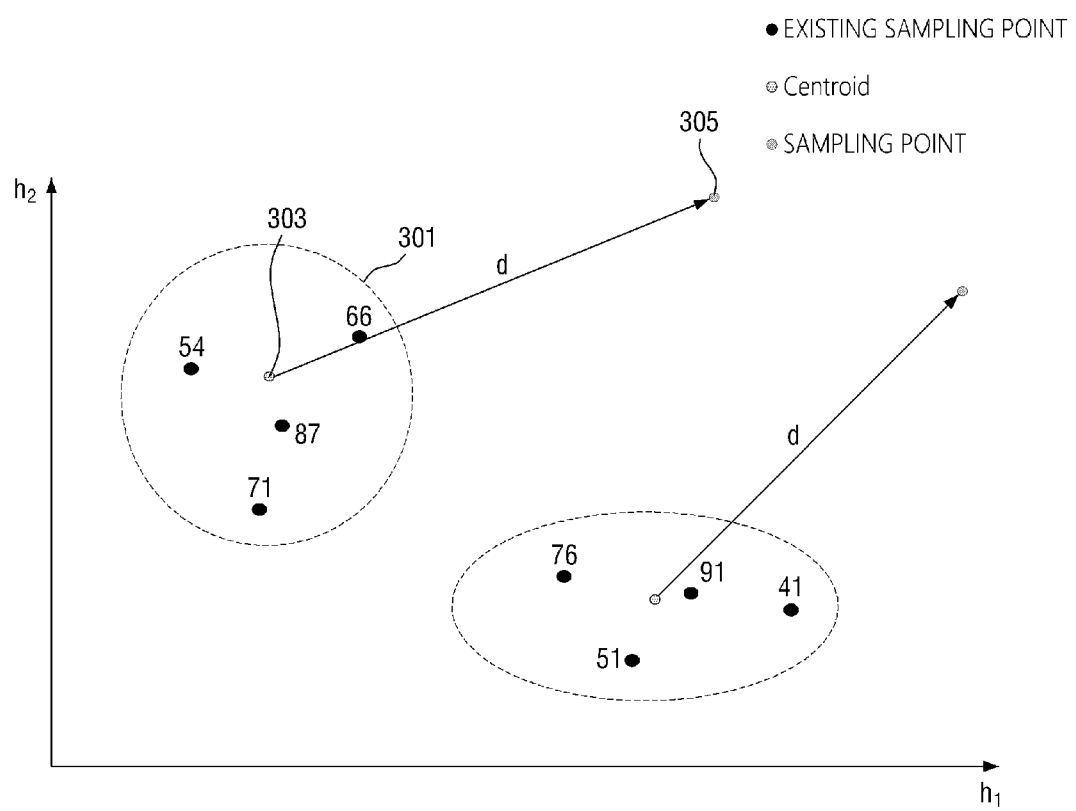

In some embodiments, referring to FIG. 14, the optimization apparatus 100 may sample a point 305 located a certain distance d or more away from a centroid 303 of a cluster 301 as a hyperparameter sample. In addition, the optimization apparatus 100 may add the hyperparameter sample 305 to the optimal hyperparameter sample set in response to the determination that an evaluation score of the hyperparameter sample 305 is equal to or greater than a threshold. Here, the distance d may be a value larger than the size of the cluster 301 because the objective of the current embodiments is to sample a hyperparameter sample having superior performance in an area not searched previously.

In some embodiments, the optimization apparatus 100 may exclude, for each cluster, hyperparameter samples whose evaluation scores are less than a threshold and construct the optimal hyperparameter sample set based on the remaining hyperparameter samples. According to an embodiment, the process of excluding some hyperparameter samples based on evaluation scores may be performed before the clustering operation S140. In the current embodiments, the optimization apparatus 100 may keep the excluded hyperparameter samples, recalculate the evaluation scores of the excluded hyperparameter samples for a new dataset 213 when the dataset 213 is provided, and add hyperparameter samples whose calculated evaluation scores are equal to or greater than the threshold to the optimal hyperparameter sample set. A technical idea similar to the current embodiments will be additionally described later with reference to FIG. 18.

In some embodiments, the optimal parameter sample set may be constructed based on a combination of the above-described embodiments.

Referring again to FIG. 5, when the additional dataset 213 is provided for the target model, the optimization apparatus 100 may update the optimal hyperparameter sample set in operation S180. This operation S180 may be repeatedly performed whenever a new dataset is provided. A specific method performed in this operation S180 may vary depending on embodiments.

In some embodiments, the optimization apparatus 100 may recalculate the evaluation score of each hyperparameter belonging to the optimal hyperparameter sample set for the new dataset 213 and update the optimal hyperparameter sample set based on the recalculated evaluation scores.

In an embodiment, the optimization apparatus 100 may exclude some samples whose recalculated evaluation scores are less than a threshold from the optimal hyperparameter sample set. The update operation S180 may be repeatedly performed whenever a dataset is updated. In this case, the optimization apparatus 100 may keep the excluded hyperparameter samples, recalculate the evaluation scores of the excluded hyperparameter samples for a newly added dataset, and add hyperparameter samples whose recalculated evaluation scores are equal to or greater than the threshold to the optimal hyperparameter sample set.

In an embodiment, the optimization apparatus 100 may fine-tune a value of a hyperparameter sample whose recalculated evaluation score is less than a threshold. For example, the fine-tuning may be performed by an operation such as adding or subtracting a very small value to or from the value of the hyperparameter sample. In addition, the optimization apparatus 100 may recalculate the evaluation score of the fine-tuned hyperparameter sample and exclude the hyperparameter sample from the optimal hyperparameter sample set or maintain the hyperparameter sample in the optimal hyperparameter sample set based on the recalculated evaluation score.

Figure 15:
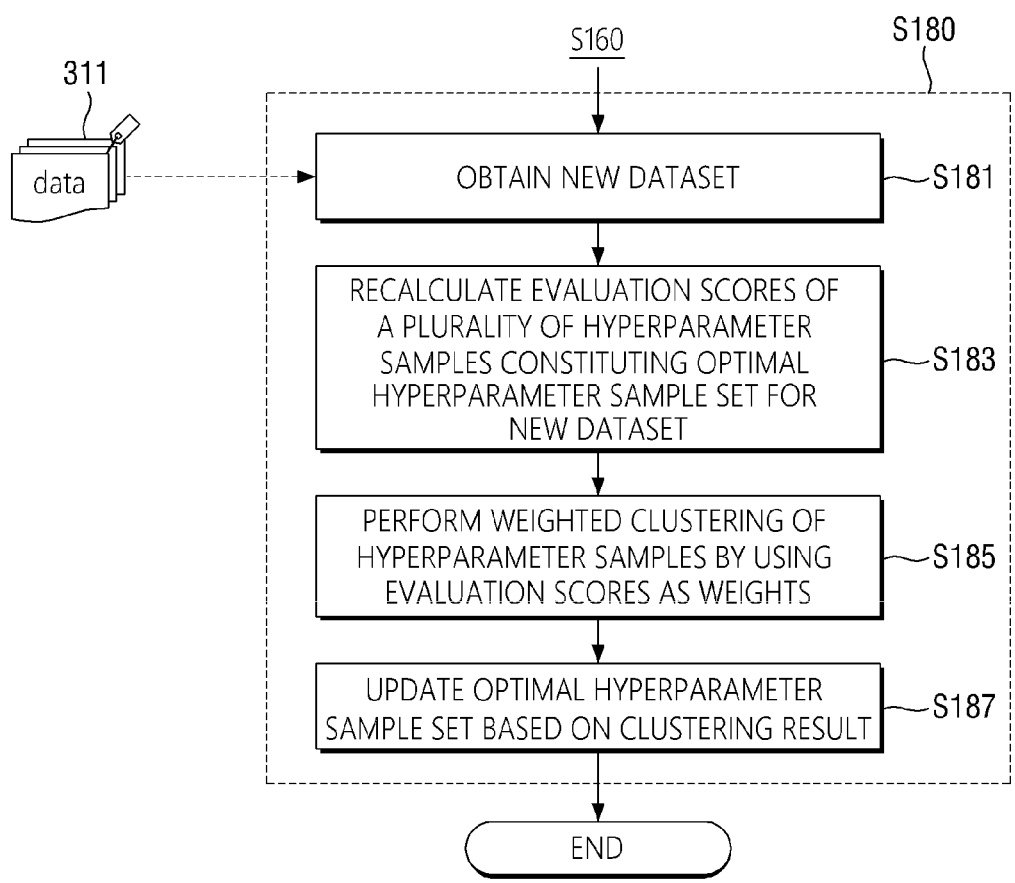
FIG. 15 is a flowchart illustrating a method of updating an optimal hyperparameter sample set according to embodiments, which can be performed in operation S180 of FIG. 5.

In some embodiments, the optimization apparatus 100 may update the optimal hyperparameter sample set according to the process illustrated in FIG. 15. Specifically, in response to the acquisition of a new dataset 311, the optimization apparatus 100 may recalculate evaluation scores of a plurality of hyperparameter samples constituting the optimal hyperparameter sample set, perform weighted clustering of the hyperparameter samples using the recalculated evaluation scores as weights, and update the optimal hyperparameter sample set based on the clustering result in operations S181 through S187. Details of operation S187 are similar to those of operation S160, and thus a detailed description thereof is omitted.

In some embodiments, the optimization apparatus 100 may update the optimal hyperparameter sample set based on a combination of the above-described embodiments.

For reference, of operations S100 through S180 illustrated in FIG. 5, operation S100 may be performed by the initial sample set construction unit 110, operations S120 through S160 may be performed by the optimal sample set construction unit 130, and operation S180 may be performed by the optimal sample set update unit 150.

Until now, the hyperparameter optimization method according to the first embodiment has been described with reference to FIGS. 5 through 15. According to the method described above, a grid-based exhaustive search is not performed. Instead, hyperparameter samples predicted to have superior performance are sampled through weighted clustering. Accordingly, computing costs can be significantly reduced as compared with a conventional technique totally relying on grid search, and the accuracy and reliability of the optimization result can be significantly improved as compared with random search.

In addition, hyperparameter optimization is not performed from the beginning whenever a dataset is updated. Instead, the optimization is performed using an existing optimal hyperparameter sample set. Accordingly, the average computing costs consumed in the hyperparameter optimization can be significantly reduced.

A hyperparameter optimization method according to a second embodiment will now be described with reference to FIG. 16 and subsequent drawings.

Figure 16:
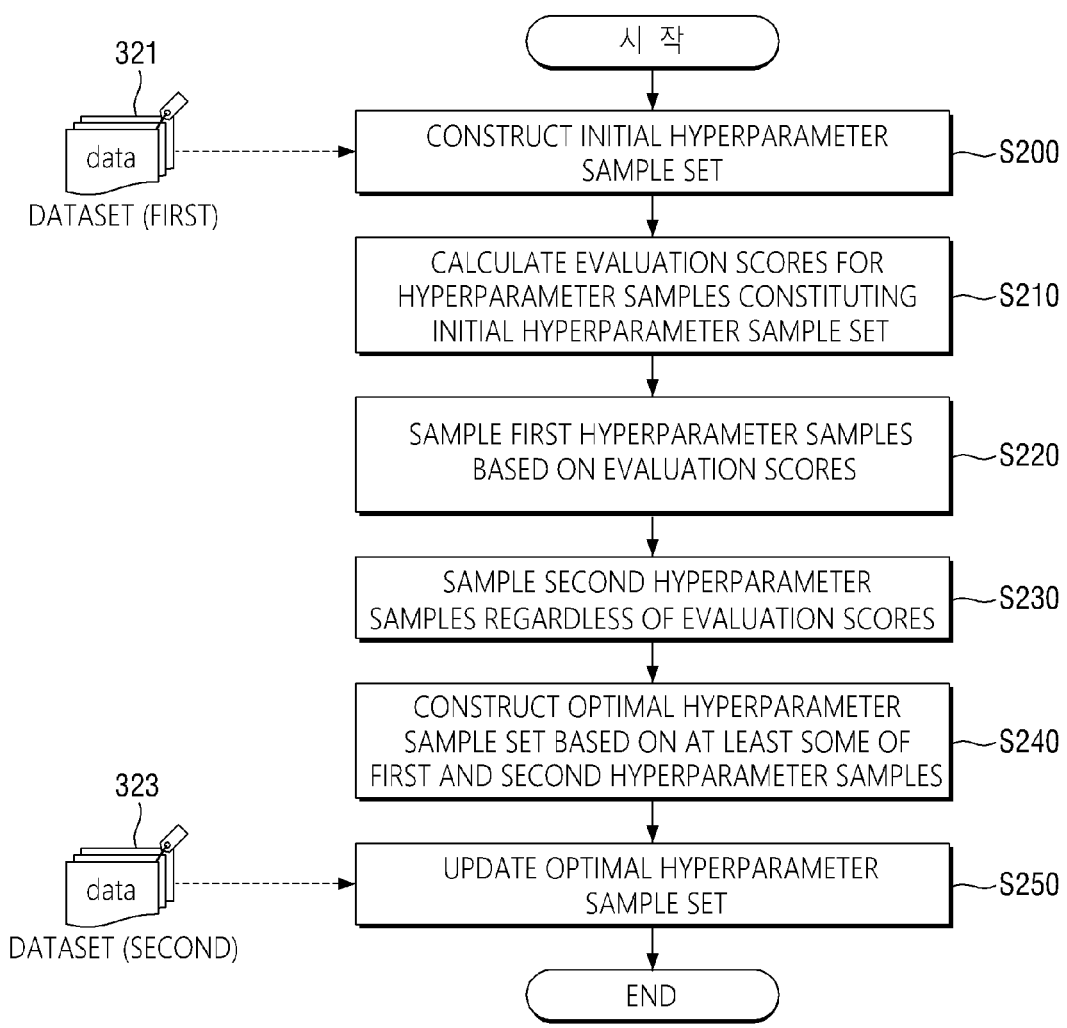
FIG. 16 is a flowchart illustrating a hyperparameter optimization method according to a second embodiment.

FIG. 16 is a flowchart illustrating a hyperparameter optimization method according to a second embodiment. However, this is merely an embodiment for achieving the objectives of the present disclosure, and some operations can be added or deleted as needed.

Referring to FIG. 16, the hyperparameter optimization method according to the second embodiment starts with operation S200 in which the optimization apparatus 100 constructs an initial hyperparameter sample set for a target model. This operation S200 is similar to operation S100 described above, and thus a further description thereof is omitted.

In operation S210, the optimization apparatus 100 calculates evaluation scores for hyperparameter samples constituting the initial hyperparameter sample set.

In operation S220, the optimization apparatus 100 samples first hyperparameter samples based on the calculated evaluation scores. This operation S220 can be understood as a procedure for sampling hyperparameter samples, which are expected to further improve the performance of the target model, based on the calculated evaluation scores. A specific method of sampling the first hyperparameter samples may vary depending on embodiments.

In some embodiments, the optimization apparatus 100 may sample the first hyperparameter samples through weighted clustering as described above with reference to FIGS. 11 through 13.

Figure 17:
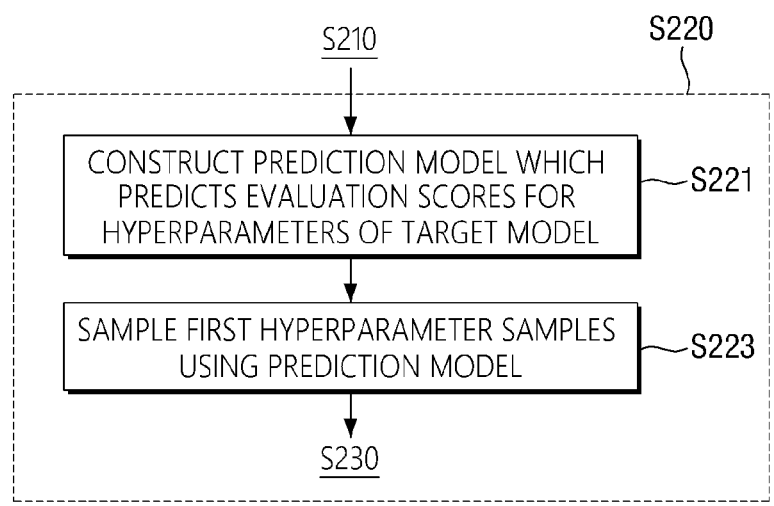
FIG. 17 is a flowchart illustrating a method of sampling hyperparameter samples based on evaluation scores according to an embodiment, which can be performed in operation S220 of FIG. 16.

In some embodiments, the optimization apparatus 100 may sample the first hyperparameter samples using a predetermined prediction model as illustrated in FIG. 17. Specifically, the optimization apparatus 100 may construct a prediction model, which predicts evaluation scores of hyperparameters, using existing hyperparameter samples and an evaluation score for each of the existing hyperparameter samples and sample the first hyperparameter samples through the constructed prediction model in operations S221 and S223.

In some embodiments, the optimization apparatus 100 may sample the first hyperparameter samples by fine-tuning values of hyperparameter samples whose evaluation scores are equal to or greater than a threshold.

In some embodiments, the optimization apparatus 100 may sample the first hyperparameter samples according to a combination of the above-described embodiments.

Referring again to FIG. 16, in operation S230, the optimization apparatus 100 samples second hyperparameter samples regardless of the evaluation scores. This operation S230 can be understood as a procedure for trying other hyperparameter samples regardless of the calculated evaluation scores. A specific method by which the optimization apparatus 100 samples the second hyperparameter samples may vary depending on embodiments.

In some embodiments, the optimization apparatus 100 may sample the second hyperparameter samples using at least some of the methods described above with reference to FIGS. 6 through 10. That is, some methods (e.g., random search) used to construct the initial hyperparameter sample set may be used to sample the second hyperparameter samples.

In operation S240, the optimization apparatus 100 constructs an optimal hyperparameter sample set based on the initial hyperparameter sample set and at least some of the first and second hyperparameter samples. A specific method by which the optimization apparatus 100 constructs the optimal hyperparameter sample set may vary depending on embodiments.

In some embodiments, the optimization apparatus 100 may construct the optimal hyperparameter sample set based on samples remaining after samples whose evaluation scores are less than a threshold is excluded from the hyperparameter samples (i.e., the initial hyperparameter sample set, the first hyperparameter samples and the second hyperparameter samples) sampled so far. For example, the optimization apparatus 100 may calculate an evaluation score for a second hyperparameter sample by applying the second hyperparameter sample to the target model and add the second hyperparameter sample to the optimal hyperparameter sample set in response to the determination that the evaluation score of the second hyperparameter sample is equal to or greater than the threshold. Conversely, the second hyperparameter sample may be excluded from the optimal hyperparameter sample set in response to the determination that the evaluation score of the second hyperparameter sample is less than the threshold.

When a new dataset 323 is provided, the optimization apparatus 100 may update the optimal hyperparameter sample set in operation S250. This operation S250 may be repeatedly performed whenever a new dataset is provided. A specific method by which this operation S250 is performed may vary depending on embodiments.

In some embodiments, the optimization apparatus 100 may perform the above-described operations S210 through S240 again for the new dataset 323. That is, the optimization apparatus 100 may recalculate the evaluation score of each of the hyperparameter samples constituting the optimal hyperparameter sample set for the dataset 323, sample the first hyperparameter samples based on the recalculated evaluation scores, sample the second hyperparameter samples regardless of the evaluation scores, and update the optimal hyperparameter sample based on at least some of the first and second hyperparameter samples.

Figure 18:
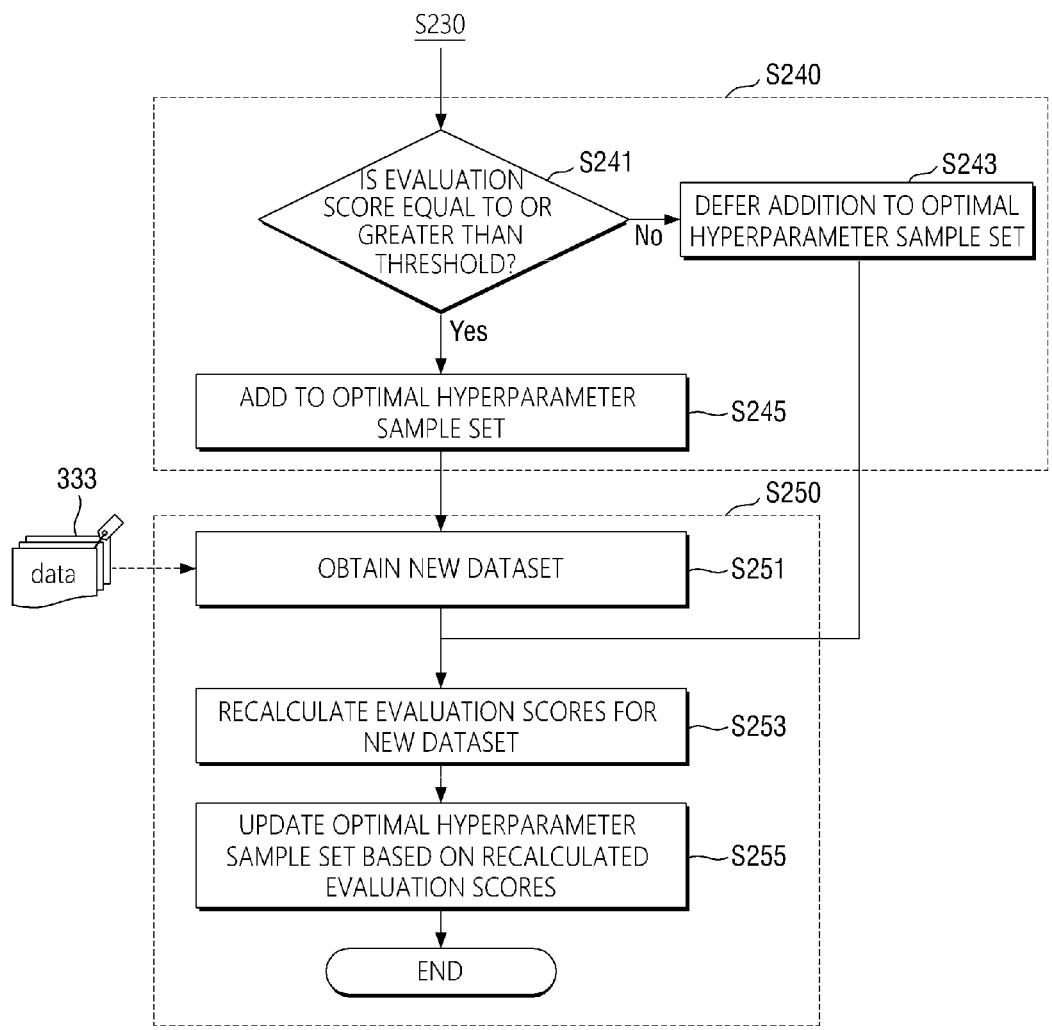
FIG. 18 is a flowchart illustrating a method of constructing and updating an optimal hyperparameter sample set according to an embodiment, which can be performed in operations S240 and 250 of FIG. 16.

In some embodiments, the optimization apparatus 100 may update the optimal hyperparameter sample set as illustrated in FIG. 18. Specifically, in response to the acquisition of a new dataset 333, the optimization apparatus 100 may recalculate the evaluation scores of the hyperparameter samples constituting the optimal hyperparameter sample set for the dataset 333 and update the optimal hyperparameter sample set based on the recalculated evaluation scores in operations S251 through S253. For example, a hyperparameter sample whose evaluation score is less than a threshold may be excluded from the optimal hyperparameter sample set.

Here, the optimization apparatus 100 may also recalculate the evaluation scores for hyperparameter samples sampled but not included in the optimal hyperparameter sample set, thereby giving an opportunity for such hyperparameters to be included in the optimal hyperparameter sample set. For example, there may be some hyperparameter samples whose evaluation scores for an existing dataset are too low to be added to the optimal hyperparameter sample set in operations S241 and S243. In this case, the optimization apparatus 100 may recalculate the evaluation scores of the hyperparameter samples for the new dataset 333 and add the hyperparameter samples to the optimal hyperparameter sample set based on the recalculated evaluation scores.

In some embodiments, the optimization apparatus 100 may update the optimal hyperparameter sample set based on a combination of the above-described embodiments.

For reference, of operations S200 through S250 illustrated in FIG. 16, operation S200 may be performed by the initial sample set construction unit 110, operations S210 through S240 may be performed by the optimal sample set construction unit 130, and operation S50 may be performed by the optimal sample set update unit 150.

Until now, the hyperparameter optimization method according to the second embodiment has been described with reference to FIGS. 16 through 18. According to the method described above, it is possible to efficiently perform hyperparameter optimization by utilizing both a first sampling policy for performing sampling using evaluation scores of existing hyperparameter samples and a second sampling policy for exploratively performing sampling regardless of evaluation scores.

Until now, some embodiments of the present disclosure and the effects of the embodiments have been described with reference to FIGS. 2 through 18. However, the effects of the embodiments are not restricted to the one set forth herein. The above and other effects of the embodiments will become more apparent to one of daily skill in the art to which the embodiments pertain by referencing the claims.

While the present disclosure has been particularly illustrated and described with reference to exemplary embodiments thereof, it will be understood by those of ordinary skill in the art that various changes in form and detail may be made therein without departing from the spirit and scope of the present disclosure as defined by the following claims. The exemplary embodiments should be considered in a descriptive sense only and not for purposes of limitation.

What is claimed is:

1. A hyperparameter optimization method performed by a hyperparameter optimization apparatus comprising a processor to optimize hyperparameters of a model, the method comprising:

calculating, by the processor, an evaluation score for each of hyperparameter samples constituting a first hyperparameter sample set by applying each of the hyperparameter samples to a target model;

performing, by the processor, weighted clustering of the hyperparameter samples by using the calculated evaluation scores as weights; and constructing, by the processor, a second hyperparameter sample set based on the weighted clustering, wherein the constructing of the second hyperparameter sample set comprises:

sampling a hyperparameter sample at a centroid of a cluster formed through the clustering as a first hyperparameter sample; and constructing the second hyperparameter sample set based on the first hyperparameter sample.

2. The method of claim 1, wherein the hyperparameter samples are sampled through at least one of a grid search and a random search.

3. The method of claim 1, wherein the constructing of the second hyperparameter sample set based on the first hyperparameter sample comprises:

predicting an evaluation score of the first hyperparameter sample based on evaluation scores of hyperparameter samples belonging to the cluster;

determining if the predicted evaluation score satisfies a predetermined condition; and adding the first hyperparameter sample to the second hyperparameter sample set in response to the determination that the predicted evaluation score satisfies the predetermined condition.

4. The method of claim 1, wherein the constructing of the second hyperparameter sample set comprises:
   determining a hyperparameter sample, whose evaluation score is less than a threshold, among the hyperparameter samples belonging to the cluster formed through the clustering; and
   constructing the second hyperparameter sample set based on the hyperparameter samples excluding the determined hyperparameter sample.

5. The method of claim 1, wherein the constructing of the second hyperparameter sample set comprises:
   calculating a centroid of a cluster formed through the clustering;
   sampling a point located a threshold distance or more away from the calculated centroid as a first hyperparameter sample;
   calculating an evaluation score for the first hyperparameter sample by applying the first hyperparameter sample to the target model;
   determining if the evaluation score of the first hyperparameter sample is equal to or greater than a threshold; and
   adding the first hyperparameter sample to the second hyperparameter sample set in response to the determination that the evaluation score of the first hyperparameter sample is equal to or greater than the threshold.

6. The method of claim 1, further comprising:
   sampling a first hyperparameter sample regardless of the weighted clustering;
   calculating an evaluation score for the first hyperparameter sample by applying the first hyperparameter sample to the target model; and
   determining if the evaluation score of the first hyperparameter sample is equal to or greater than a threshold; and
   wherein the constructing of the second hyperparameter sample set comprises adding the first hyperparameter sample to the second hyperparameter sample set in response to the determination that the evaluation score of the first hyperparameter sample is equal to or greater than the threshold.

7. The method of claim 1, wherein the hyperparameter samples are first hyperparameter samples, the evaluation scores are first evaluation scores, the second hyperparameter sample set is constructed for a first dataset; and
   the method further comprises:
   obtaining a second dataset;
   calculating a second evaluation score for each of second hyperparameter samples constituting the second hyperparameter sample set by applying the second dataset and each of the second hyperparameter samples to the target model; and
   updating the second hyperparameter sample set based on the second evaluation scores.

8. The method of claim 7, wherein the updating of the second hyperparameter sample set comprises:
   performing weighted clustering of the second hyperparameter samples by using the second evaluation scores as weights; and
   updating the second hyperparameter sample set based on the weighted clustering of the second hyperparameter samples.

9. A hyperparameter optimization method performed by a hyperparameter optimization apparatus comprising a processor to optimize hyperparameters of a model, the method comprising:
   calculating, by the processor, an evaluation score for each of hyperparameter samples constituting a first hyperparameter sample set by applying each of the hyperparameter samples to a target model;
   sampling a first hyperparameter sample based on the calculated evaluation scores;
   sampling a second hyperparameter sample regardless of the calculated evaluation scores; and
   constructing, by the processor, a second hyperparameter sample set based on at least a part of the first and second hyperparameter samples,
   wherein the sampling of the first hyperparameter sample comprises:
   performing weighted clustering of the hyperparameter samples constituting the first hyperparameter sample set by using the calculated evaluation scores as weights; and
   sampling a hyperparameter sample at a centroid of a cluster formed through the weighted clustering as the first hyperparameter sample.

10. The method of claim 9, wherein the constructing of the second hyperparameter sample set comprises:
    predicting an evaluation score of the first hyperparameter sample based on evaluation scores of hyperparameter samples belonging to the cluster;
    determining if the predicted evaluation score satisfies a predetermined condition; and
    adding the first hyperparameter sample to the second hyperparameter sample set in response to the determination that the predicted evaluation score satisfies the predetermined condition.

11. The method of claim 9, wherein the sampling of the first hyperparameter sample comprises:
    constructing a prediction model, which predicts evaluation scores for hyperparameter of the target model, using the calculated evaluation scores; and
    sampling the first hyperparameter sample using the prediction model.

12. The method of claim 9, wherein the sampling of the second hyperparameter sample comprises:
    designating a part of a hyperparameter space of the target model as a search area; and
    sampling the second hyperparameter sample by performing a grid search in the designated search area.

13. The method of claim 12, wherein the performing of the grid search comprises:
    forming a first grid in the search area;
    determining a part of the search area as a sampling area by searching the first grid;
    forming a second grid in the sampling area; and
    sampling the second hyperparameter sample by searching the second grid,
    wherein the second grid is more finely spaced than the first grid.

14. The method of claim 9, wherein the evaluation scores are first evaluation scores, the second hyperparameter sample set is constructed for a first dataset; and
    the method further comprises:
    obtaining a second dataset;
    calculating second evaluation scores for the second hyperparameter sample set by applying the second dataset and hyperparameter samples constituting the second hyperparameter sample set to the target model; and
    updating the second hyperparameter sample set based on the second evaluation scores.

15. The method of claim 9, wherein the constructing of the second hyperparameter sample set comprises calculating a first evaluation score for the first hyperparameter sample by applying the first hyperparameter sample and the first dataset to the target model, determining if the first evaluation score is less than a threshold, and constructing the second hyperparameter sample set by excluding the first hyperparameter sample in response to the determination that the first evaluation score is less than the threshold; and the method further comprises:
obtaining a second dataset;
calculating a second evaluation score for the first hyperparameter sample by applying the first hyperparameter sample and the second dataset to the target model; and
adding the first hyperparameter sample to the second hyperparameter sample set in response to the determination that the second evaluation score is equal to or greater than the threshold.

16. A hyperparameter optimization apparatus comprising:
a processor; and
a memory which stores one or more programs to be executed by the processor,
wherein at least one of the one or more programs comprises an instruction for performing:
an operation of calculating an evaluation score for each of hyperparameter samples constituting a first hyperparameter sample set by applying each of the hyperparameter samples to a target model;
an operation of performing weighted clustering of the hyperparameter samples by using the calculated evaluation scores as weights; and
an operation of constructing a second hyperparameter sample set based on the weighted clustering,
wherein the operation of constructing the second hyperparameter sample set comprises:
an operation of sampling a hyperparameter sample at a centroid of a cluster formed through the clustering as a first hyperparameter sample; and
an operation of constructing the second hyperparameter sample set based on the first hyperparameter sample.

* * * * *